United States Patent
Misaka

[19]

[11] Patent Number: 5,828,850
[45] Date of Patent: Oct. 27, 1998

[54] BUSLINE LENGTH RECOGNITION SYSTEM

[75] Inventor: Toshio Misaka, Gunma, Japan

[73] Assignee: NEC Corporation, Tokyo, Japan

[21] Appl. No.: 336,197

[22] Filed: Nov. 2, 1994

[30]   Foreign Application Priority Data

Nov. 5, 1993 [JP] Japan .................................. 5-276249

[51] Int. Cl.⁶ .................................................. G06F 13/00
[52] U.S. Cl. .......................................................... 395/280
[58] Field of Search .................................... 395/280, 306,
395/309, 550, 185.09; 326/30, 31, 33; 370/13,
14, 15; 371/20.1, 20.5; 324/532, 533, 534,
535

[56]   References Cited

U.S. PATENT DOCUMENTS

| | | | |
|---|---|---|---|
| 3,911,358 | 10/1975 | Shalyt et al. ............................. | 324/532 |
| 4,023,154 | 5/1977 | Comeaux ................................. | 324/533 |
| 4,148,011 | 4/1979 | McLagan et al. ................. | 364/DIG. 2 |
| 5,095,444 | 3/1992 | Motles ..................................... | 370/13 |
| 5,119,496 | 6/1992 | Nishikawa et al. ..................... | 395/742 |
| 5,140,680 | 8/1992 | Best ........................................ | 395/290 |
| 5,142,526 | 8/1992 | Morine et al. ............................ | 370/13 |
| 5,162,743 | 11/1992 | Kruchowski et al. ................... | 324/533 |
| 5,179,341 | 1/1993 | Whiteside ................................. | 370/13 |
| 5,261,060 | 11/1993 | Free ......................................... | 395/309 |
| 5,321,632 | 6/1994 | Otsuji et al. ............................. | 324/533 |

*Primary Examiner*—Jack B. Harvey
*Assistant Examiner*—Xuong M. Chung-Trans
*Attorney, Agent, or Firm*—Young & Thompson

[57]   ABSTRACT

A delay gate is provided within a control unit to delay the reset signal by a predetermined period of time to monitor the time at which the reset signal passes through the busline. If the busline length exceeds a prescribed length, then an LED is turned on. Or a resistance proportional to the length of a duplex bus signal line is connected to each connecting portion, a reference resistance is provided internally of the control unit and one of the duplex signal buslines of the connecting portion is grounded while the other is connected through the reference resistance to a reference power supply to compare the potential difference between the reference resistance and the connecting point of the duplex signal busline with a reference signal so that, when the busline length exceeds a prescribed value, the LED is turned on. As a result, when the user daisy-chains the components freely, it becomes possible to inform whether the entire line length has been exceeded or not, and therefore, unstable operation of the system leading to the occurrence of troubles can be prevented. Further, even if the connecting portions or the terminal resistance module is disconnected, it can be informed to the user.

7 Claims, 6 Drawing Sheets

FIG.6a HHH

FIG.6b HLL

FIG.6c LHH

BUSLINE LENGTH RECOGNITION SYSTEM

BACKGROUND OF THE INVENTION

The present invention relates to a system for recognizing the busline length of a computer system which, when a control unit and a plurality of components are connected in series by means of a plurality of connecting portions, recognizes the busline length by an electrical means to switch the transfer rates.

DESCRIPTION OF THE RELATED ART

In recent computer systems, as a mode for interconnecting the central control unit (control unit) and the peripheral units (components), a bus connection system such as for SCSI bus or the like has been utilized.

These are arranged so that the bus signal from the control unit of the computer device is transmitted to a first component by means of a interconnecting means such as a cable or the like, the first component utilizing its bus signal therein while sending it out to a next component as it is, the sent signal being further transmitted to a still further component.

As described above, the plurality of components is connected in series (so-called daisy chain connection), and a terminal resistance module is connected to a terminal component to carry out a terminal processing.

Such a bus connection system, in order to prevent degradation of the signal, prescribes the entire line length, and it is allowed for that the faster the transmission speed of the signal becomes, the shorter the line length is defined.

However, in the foregoing conventional computer system, since the user can connect the components freely in the daisy-chain configuration, management of the entire line length is not virtually carried out and, therefore, the line length often exceeds the prescribed value causing insufficient levels of transmitted voltages and thereafter unstable operations of the system.

Further, U.S. Pat. No. 5,117,494 describes about the daisy chain connection, but doesn't describe about the entire line length.

SUMMARY OF THE INVENTION

Accordingly, a first object of the present invention is to provide a system which, even if the busline length is extended, allows it to be readily recognized whether it is within a range in which the reliability of the transmission signal can be maintained or not.

A second object of the present invention is to provide a system which can be accommodated within the control unit, which can determine only by applying a simple processing to the terminal end of the busline and which can be simply judged whether the busline length is within a prescribed range or not.

A third object of the present invention is to provide a recognition system which, if this control unit and each component are connected in the daisy-chain configuration, allows the length of that busline to be effectively restricted.

A forth object of the present invention is to provide a recognition system which can compose with a simple circuit whether the busline length is being used within a prescribed range or not.

A first busline length recognition system according to the present invention comprises a control unit, a plurality of components each having two duplex signal buslines, a plurality of connecting portions each having two signal lines for connecting the control unit and the plurality of components in series and a terminal resistance module having a line which short-circuits the foregoing two duplex signal buslines of a terminal one of the foregoing plurality of components, the control unit providing a delay gate to which a reset signal is entered, a NOT-gate to which a signal from the connecting portion is entered, a NAND-gate to which the signals emitted from the delay gate and the NOT-gate are entered, a flip-flop set by the signal emitted from the NAND-gate and reset by the reset signal and a light emitting diode (LED) for emitting light by the signal emitted from the flip-flop.

A second busline length recognition system according to the present invention comprises a control unit, a plurality of components each having two duplex signal buslines, a plurality of connecting portions having two signal lines for connecting the control unit and the plurality of components in series and a terminal resistance module having a signal line for short circuiting the two duplex signal buslines of a terminal one of the plurality of components, a resistance proportional to the length of the signal line of each interconnecting portion being connected to one of each two signal lines of the plurality of interconnecting portions, the control unit providing therein a grounding portion for grounding one of the two signal lines of the interconnecting portion, a reference resistance portion for connecting the other of the two signal lines of the interconnecting portion to a reference power supply, an A-D converter connected to a reference resistance portion, a comparator for comparing the signal emitted from the A-D converter with a reference signal and a light emitting diode for emitting light by the signal emitted form the comparator.

A third busline length recognition system according to the present invention comprises a control unit, a plurality of components each having two duplex signal buslines, a plurality of connecting portions each having two signal lines for connecting the plurality of components in series and a terminal resistance module having a single signal line for short-circuiting the two duplex signal buslines of a terminal one of the plurality of components, a resistance proportional to the length of the signal line of each connecting portion being connected to one of the two signal lines of each of the plurality of connecting lines, the control unit being provided therein with a grounding portion for grounding one of the two signal lines of the connecting portion, a reference resistance for connecting the other of the two signal lines of the connecting portion to the power supply, an A-D converter connected to the reference resistance, a first comparator for comparing the signal emitted from the A-D converter with the first reference signal, a light emitting diode for emitting light by the signal emitted from the first signal, a second comparator for comparing each the signal emitted from the A-D converter and a second reference signal, a first NOT-gate to which the signal emitted from the first comparator is entered, a second NOT-gate to which the signal emitted from the second comparator, an AND-gate to which the signal emitted from the first NOT-gate and the signal emitted from the second comparator are emitted, a flip-flop to which a clock signal and its own output signal are entered to divide the frequency and a multiplexer to which the signal emitted from the flip-flop and the clock signal are entered to select either one of them according to the signal emitted from the flip-flop or the clock signal to emit as a bus clock.

BRIEF DESCRIPTION OF THE DRAWINGS

FIG. 2 is a timing chart of the operation of the embodiment of FIG. 1, therein

FIG. 6 is each situation level of each portion of FIG. 4, therein

DESCRIPTION OF THE PREFERRED EMBODIMENTS OF THE INVENTION

Some embodiments of the present invention are described with reference to the accompanying drawings.

Figure 1:
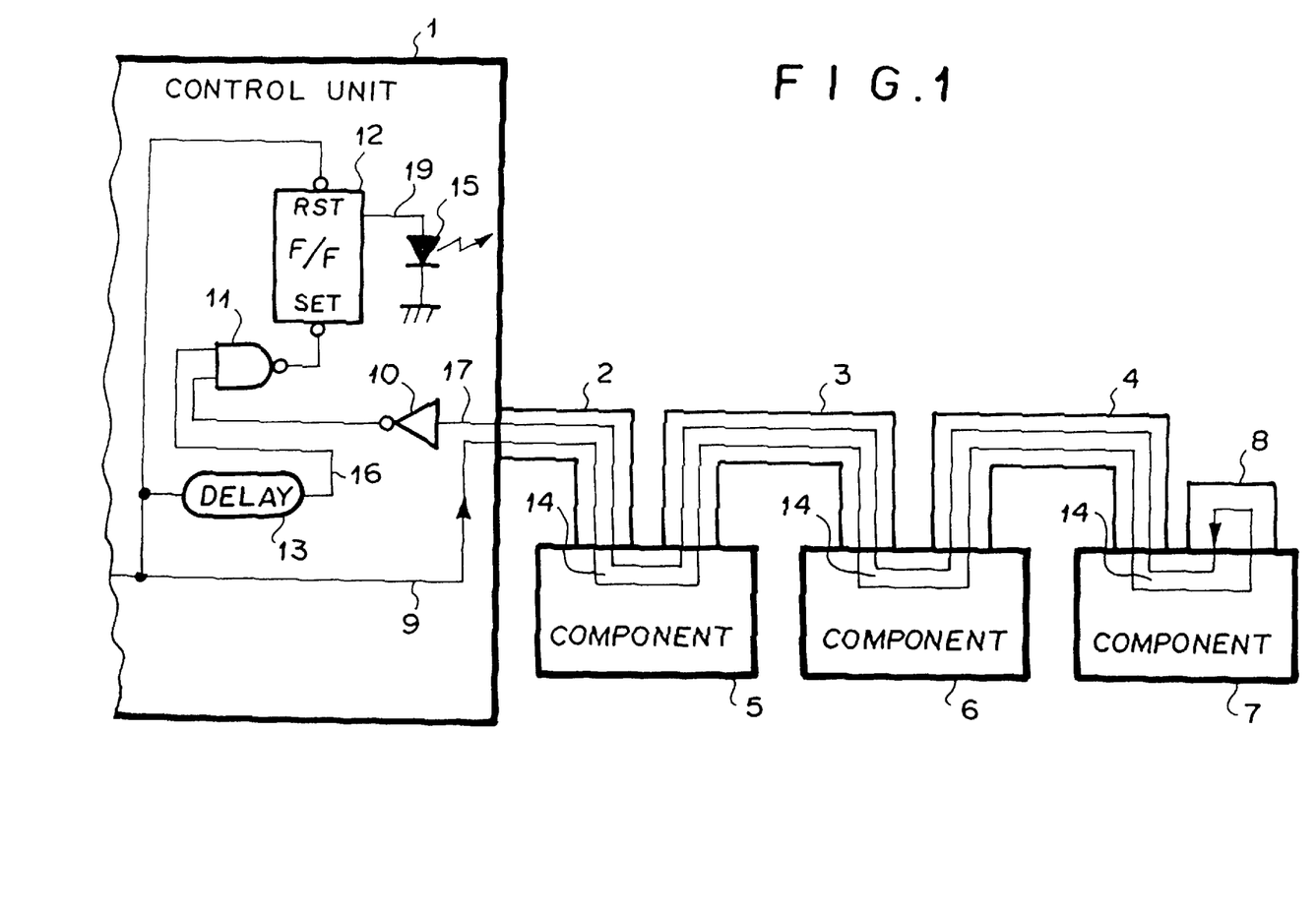
FIG. 1 is a block diagram illustrating a firs embodiment of the present invention.
Figure 2A:
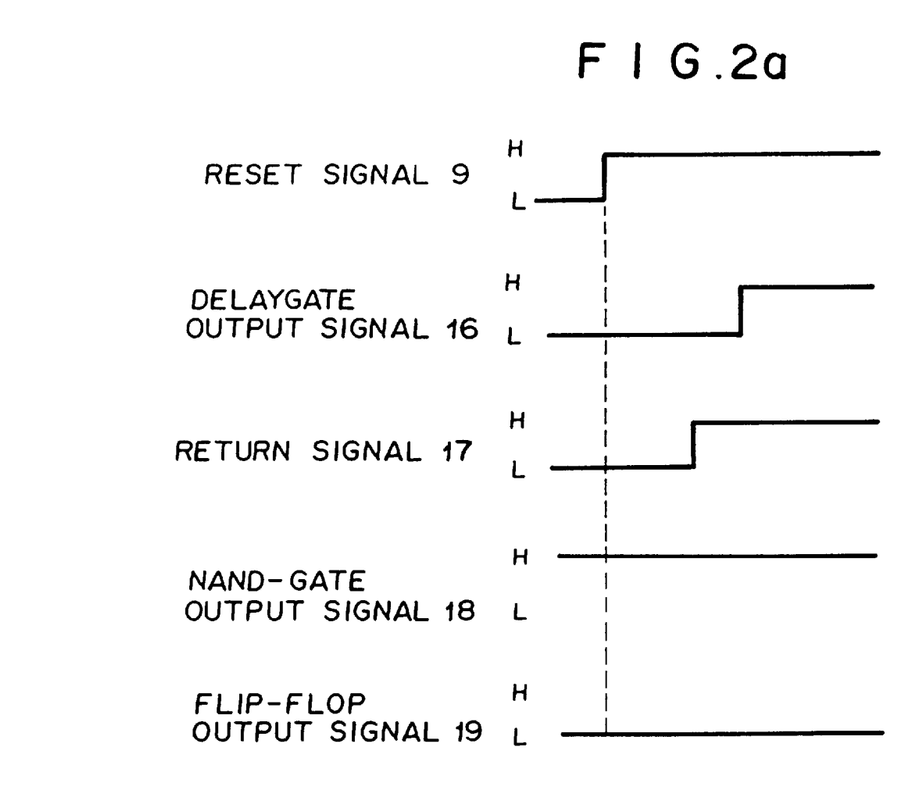
FIG. 2a is representing a case in which the busline length is within a prescribed range.
Figure 2B:
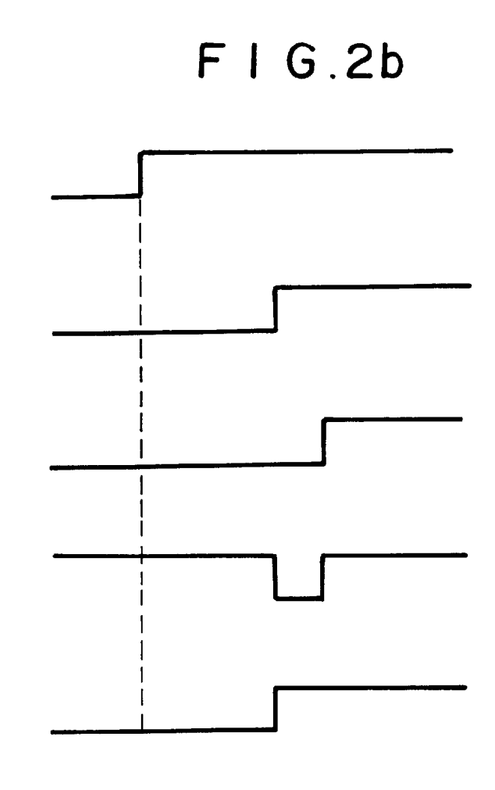
FIG. 2b is representing a case in which the busline length exceeds the prescribed range.

FIG. 1 is a block diagram illustrating a first embodiment of the present invention, FIG. 2 is a timing chart illustrating the operation of the embodiment of FIG. 1, FIG. 2a representing a case in which the busline length lies within a predefined range, FIG. 2b a case in which the busline length exceeds a predefined length.

As shown in FIG. 1, a control unit 1 and components 5 through 7 are connected in the daisy-chain configuration by means of connecting portions 2 through 4, and a terminal resistance module 8 is connected to a terminal component 7. Two duplex signal buslines 14 are provided to each component 5 through 7. The terminal resistance module 8 has a single signal line for short-circuiting two duplex signal buslines 14 of the component 7. Therefore, a transmission line system (referred to as bus) reciprocating from the control unit 1 up to the terminal component 7 is formed.

Internally of the control unit 1, a circuit is provided to detect whether the length of this transmission line system is within a prescribed range or not. That is, within the control unit 1, a delay gate (DELAY) 13 to which a reset signal (RESET signal) 9 is entered, a NOT-gate 10 to which the signal from a connecting portion 2 is entered, a NAND-gate 11 to which the signals emitted from the delay gate 13 and the NOT-gate 1 are entered, a flip-flop (F/F) 12, which is set by the signal emitted from the NAND-gate 11 and which is reset by a reset signal 9, and a light emitting diode (LED) 15, which light is turned on by the signal emitted from the flip-flop, are provided.

The reset signal 9 is a signal normally used by common computers, and turns to a low level for a predetermined period of time after the computer system is turned on. This reset signal 9 resets the flip-flop 12, applied to the reset terminal of the flip-flop 12 while being also applied to a duplex bus signal line 14 of the connecting portion 2 to be entered through connecting portions 2 through 4 and a terminal resistance module 8 to the NOT-gate 10. The signal entered to the NOT-gate is entered to one terminal of the NAND-gate 11.

The reset signal 9 is delayed for a predetermined period of time, entered to the delay gate 13, and the signal emitted from the delay gate 13 is entered to the other terminal of the NAND-gate 11. The delay time of the delay gate 13 comprises 1 nsecond per 10 cm in terms of media delay and, if the prescribed length of the bus comprises, for example, 6 m, since, in the general conductor, the signal is transmitted at the rate of about $1 \times 10^8$ m/sec, it is set to 120 nsec.

Further, as long as the material of the busline is not of special type, the delay time is set according to this propagation time. If the material of this busline is of special type, then the prescribed length to which the busline is restricted will becomes a factor for determining the delay time allowing for the propagation time of the signal which flows through the busline.

If the busline length exceeds the prescribed length, as shown in FIG. 2b, since the signal 16 emitted from the delay gate 13 rises faster than a return signal 17, the NAND-gate 11 emits one down pulse of a output signal 18 of the NAND-gate 13 to the flip-flop 12. Therefore, since the flip-flop 12 emits a signal 19 emitted from the flip-flop 12 to the LED 15, the LED 15 turns on and gives an alarm that the prescribed length is exceeded.

If the busline length is within the prescribed range, as shown in FIG. 2a, sine the return signal 17 rises faster than the delay gate 13 output signal 16, the NAND-gate 11 does not emit the signal to the flip-flop 12 and, hence, the flip-flop 12 does not emits the signal to the LED 15, and the LED 15 does no turn on.

Also when the connecting portions 2 through 4 or the terminal resistance module 8 is disconnected or cut down, since the flip-flop 12 is set, the LED 15 turns on.

Figure 3:
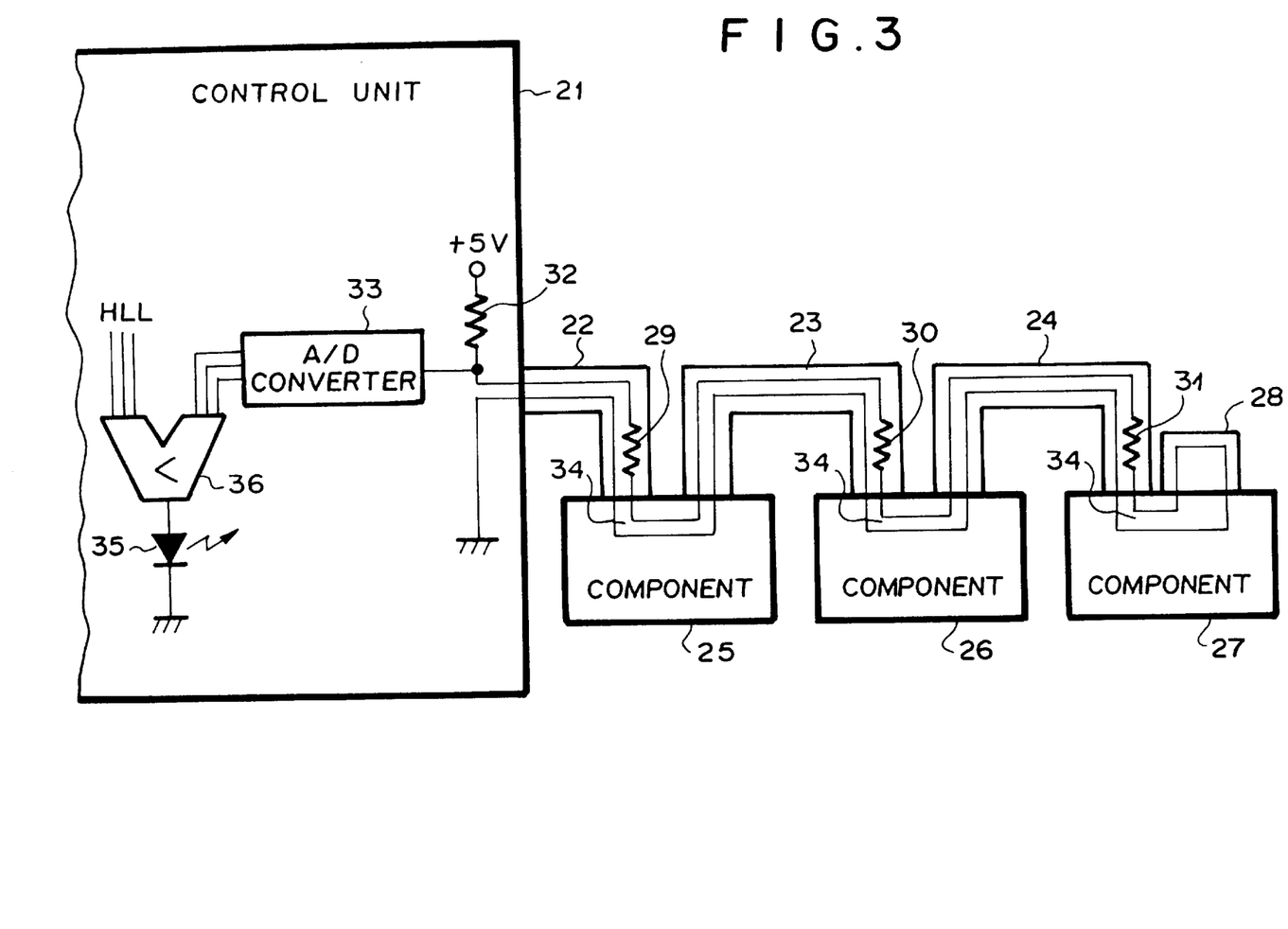
FIG. 3 is a block diagram illustrating a second embodiment of the present invention.

FIG. 3 is a block diagram illustrating a second embodiment of the present invention, in which a control unit 21, components 25 through 27, connecting portions 22 through 24 and a terminal resistance module 28 are connected, as in the embodiment of FIG. 1. The arrangements of each component 25 through 27 and the terminal resistance module 28 are the same as those of the corresponding portions of the embodiment of FIG. 1. To each single signal line of the connecting portions 22 through 24, resistances 29 through 31 proportional to the length of the reciprocating signal bus line 34 of the connecting portion are connected.

Figure 5:
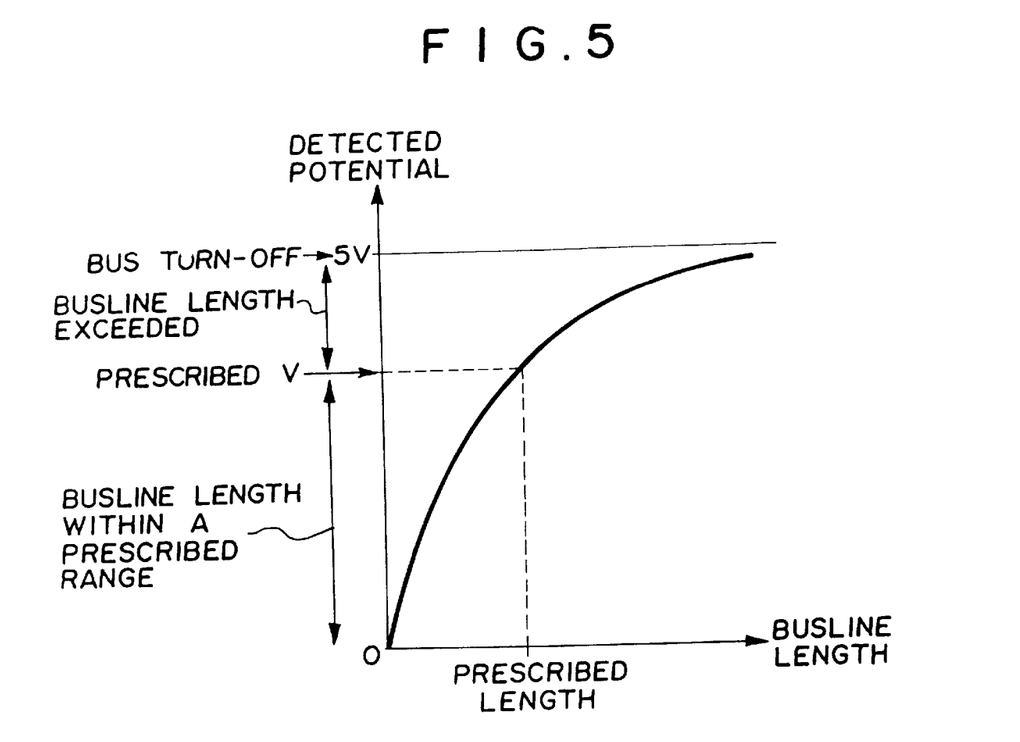
FIG. 5 is a graph chart of the detected potential of the reference resistance toward the busline length.

FIG. 5 illustrates how the potential emerges at the input of the A-D converter 33 into the control unit 21. In FIG. 5, the axis of abscissas show the busline length, and the axis of ordinates show the input voltage of the A-D converter 33. That is, if the bus length comprises 0.0 m (the resistance value of the reciprocating bus signal line 34 comprises 0 Ω), the potential indicates 0 Volt, and since the longer the busline length becomes, the higher the voltage dividing ratio becomes at the input of the A-D converter 33, the emerging voltage rises. If the busline is disconnected or turned off, then the resistance value of the reciprocating bus signal line 34 becomes infinite, and the potential at the input of the A-D converter 33 becomes 5 V.

Internally of the control unit 21 as shown in FIG. 3, one of the duplex signal busline 34 of the connecting portion 22 is grounded, and the other one connected to the resistance 29 is connected to the reference resistance 32 via the reference power supply (+5 volt). Therefore, the potential difference between the reference resistance 32 and the duplex signal busline 34 is digitally converted by means of the A-D converter 33 to be entered to one terminal of the comparator 36. The comparator 36 compares the signal entered from this A-D converter 33 with the reference signal (HLL) entered to the other terminal to, if the output signal of the A-D converter 33 is smaller than the reference signal (HLL), not light the light emitting diode (LED) 35 and, if it is greater than the reference signal (HLL), light the light emitting diode (LED) 35.

Also, if the connecting portions 22 through 22 24 or the terminal resistance module 28 is disconnected, since the resistance value of the connecting portion 22 through 24 and so on becomes great, the LED 35 turns on.

Figure 4:
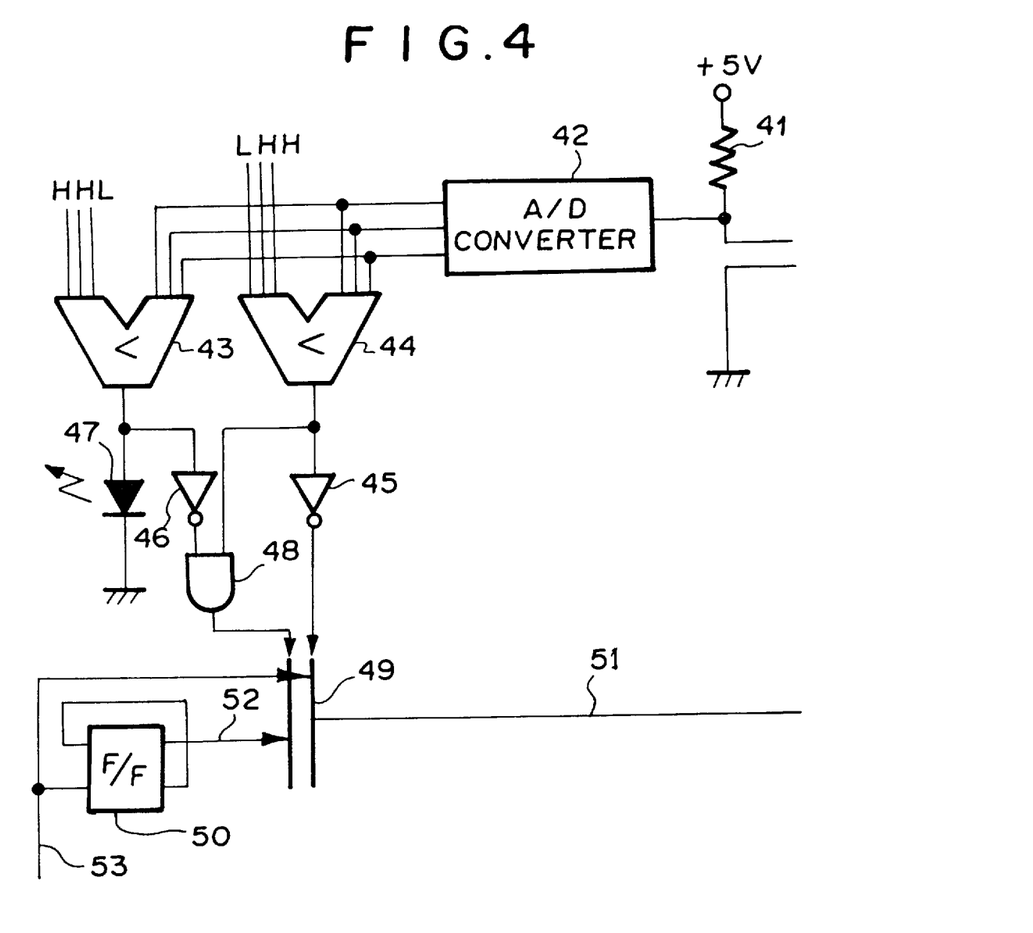
FIG. 4 is a circuit diagram illustrating an arrangement of the essential portion of a third embodiment of the present invention.

FIG. 4 is a circuit diagram illustrating the arrangement of the essential portion of a third embodiment of the present invention.

The embodiment of FIG. 4 is the same in the arrangement and connection mode of the components, connecting portions and the terminal resistance modules as that of FIG. 2. The arrangement and operation of the circuit which turns on the light emitting diode (LED) 47 by the comparator 43 are also the same as those of the embodiments of FIG. 3.

This embodiment provides a second comparator 44 other than the comparator 43, which enters the output signal of the A-D converter 42 to one terminal of the comparator 44 while entering a second reference signal (LHH) to the other terminal.

Further, there are provided a first NOT-gate 46 to which the output signal of the first comparator 43 is entered, a second NOT-gate 45 to which the output signal of the second comparator 44 is entered, an AND-gate 48 to which the output signal of the first NOT-gate 46 and the output signal of the second comparator 44 are entered, a flip-flop 50 to which a clock signal 53 and an own output signal are entered and a multiplexer 49 to which the output signal of the flip-flop 50, clock signal 53 and the output signals of the AND-gate 48 and the second NOT-gate 45 are entered to emit a bus clock 51.

Figure 6A:
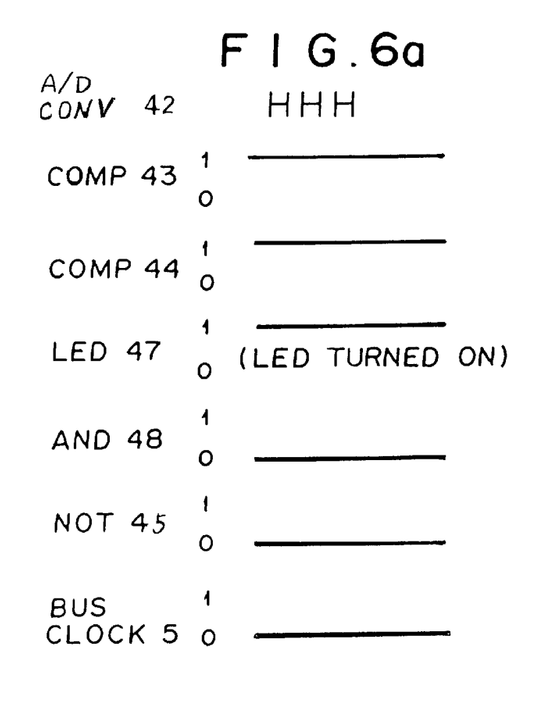
FIG. 6a is the case of which the detected potential of the resistance is the high level of HHH.

In the foregoing busline length recognition system, if the output signal of the A-D converter 42 inputting a dividing voltage among a reference resistance 41 and the resistance of the connecting portion and the terminal resistance module is smaller than the second reference signal (LHH), as shown in FIG. 6a, the output signal of the comparator 44 becomes low (level 0 as shown in FIG. 6a) and the output signal of the comparator 43 becomes low (level 0 as shown in FIG. 6a), so that the clock signal 53 is selected as the output signal of the multiplexer 49 to be used as the bus clock 51. That is, at this time, since the busline length is within the prescribed range, a clock as prescribed is used. At this time, the light emitting diode (LED) 47 does not turn on.

Figure 6B:
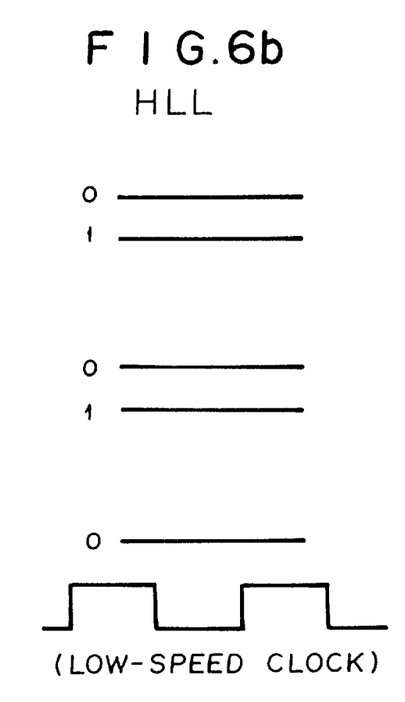
FIG. 6b is the case of which the detcted potential of the resistance is the midle level of HLL.

If the output signal of the A-D converter 42 exceeds the second reference signal (LHH) and is smaller than the first reference signal (HHL), as shown in FIG. 6b, the output signal of the comparator 44 becomes high (level 1 as shown in FIG. 6b), and the output signal of the comparator 43 becomes low (level 0 as shown in FIG. 6b), so that the multiplexer 49 selects a flip-flop output signal 52 achieved by dividing the clock signal 53 into one half at the flip-flop 50 to emit as the bus clock 51. That is, in this case, since the busline length exceeds the prescribed value but is within a movable and operative range for the components and the control unit, a clock having a frequency half as high as the prescribed one is used. Also, at this time, the light emitting diode (LED) 47 does not turn on.

Figure 6C:
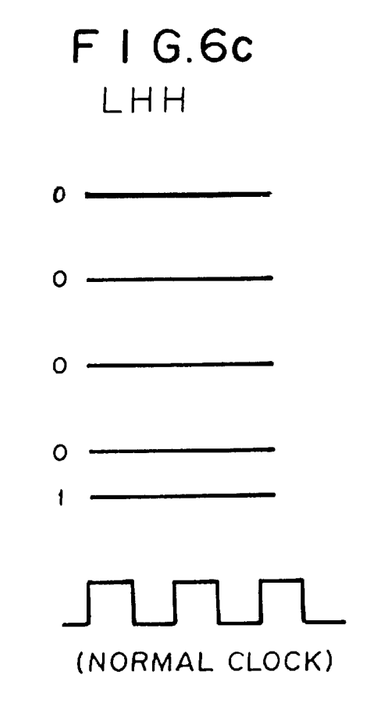
FIG. 6c is the case of whidh the detected potential of the resistance is the low level of LHH.

If the output signal of the A-D converter 42 exceeds the first reference signal (HHL), as shown in FIG. 6a, since the output signals of the comparator 43 and the comparator 44 both become high (level 1 as shown in FIG. 6c), the multiplexer 49 select neither of them, and the light emitting diode (LED) 47 turns on.

Thus, if the busline length exceeds the predefined value, the alarm LED is turned on and, when if the busline length is within the prescribed range, when the resistance value exceeds the second reference value, the transmission rate of the signal can be lowered by switching the bus clock.

As described above, in the busline length recognition system according to the present invention, a delay gate is provided within the control unit to delay the reset signal by a predetermined period of time to monitor the time at which the reset signal passes through the bus, if the busline length exceeds the predetermined length, then it turns on the light emitting diode.

The resistances of the resistors are proportional to the length of the duplex signal busline to each connecting line. And the reference resistance is provided internal to the control unit, one of the duplex bus signal lines of the connecting portion is grounded and the other one is connected through the reference resistance to the reference power supply to compare the potential difference between the reference resistance and the connecting point of the duplex signal busline with the reference signal to, when the busline length exceeds the prescribed length, turn on the light emitting diode, so that when the user daisy chains the components freely it can be detected whether the entire line length exceeds the prescribed value or not. And, therefore, unstable operations of the system, which can lead to the occurrence of trouble, can be prevented. Further, even if the connecting portions or the terminal module is disconnected or cut down, it can be informed to the user.

While this invention has been particularly shown and described with reference to the preferred embodiment thereof, it will be understood that various changes in form and details may be made therein without departing from the spirit and scope of the invention.

What is claimed is:

1. Busline length recognition system comprising:
   a control unit;
   a plurality of components each having two duplex signal buslines;
   a plurality of connecting portions each having two signal lines for connecting said control unit and said plurality of components in series, a first component of said plurality of components being connected to said control unit through a first connecting portion of said plurality of connecting portions; and
   a terminal resistance module having a single signal line for short-circuiting said two duplex signal busline of a terminal one of said plurality of components,
   wherein said control unit outputs a reset signal to a first component of said plurality of components, and comprises a delay gate to which a said reset signal is input, said delay gate having a delay time set according to a prescribed length of the duplex signal buslines, a logical NOT-gate to which a reset response signal from said first connecting portion is entered, a logical NAND-gate to which the signal emitted from said delay gate and said logical NOT-gate are entered, a flip-flop reset by said reset signal and set by the signal emitted from said logical NAND-gate, and a light emitting diode actuated by the signal emitted from said flip-flop to indicate that the busline length exceeds a predetermined length, and wherein said reset signal is applied to a first of said two duplex signal buslines, and the logical NOT-gate receives the reset response signal from a second of said two duplex signal buslines.

2. Busline length recognition system comprising a control unit and a plurality of components connected in series to one another and to the control unit by means of a busline, said system comprising:
   a control unit providing a connecting portion adapted to the busline;

a plurality of components each having two connecting portions adapted to the busline, said plurality of components and said control unit being connected in series by said busline and said two connecting portions; and a terminal resistance module connected to a busline terminal of a terminal one of said plurality of components and having a signal line for short-circuiting at least one of said buslines;

wherein said control unit comprises a reset circuit for providing a reset signal to one of the signal lines for short-circuiting said busline, a delay circuit for delaying the reset signal for a delay time set according to a prescribed length of the busline, a receiver circuit for receiving a reset response signal from the other of said short-circuiting signal lines, a logic circuit reset by the reset signal for taking a logical sum of each output of said delay circuit and said receiver circuit, and output means for outputting a result signal according to an output of said delay circuit and an output of said receiver circuit, and a light emitting element actuated by said logic circuit result signal to indicate that a prescribed busline length has been exceeded.

3. Busline length recognition system according to claim 2, wherein said control unit is provided with a processing circuit, said processing circuit being provided with a central processing unit to emit instructions to said components and to process the data from said components.

4. Busline length recognition system according to claim 2, wherein said control unit and said components are each daisy-chained by means of the busline with a specific priority assigned to each component.

5. Busline length recognition system according to claim 2, further compring a flip-flop circuit, wherein the reset signal from said central processing is provided at said flip-flop circuit, said delay circuit, and said one of the signal lines, and the output of said logic circuit is entered to the set terminal of said flip-flop.

6. Busline length recognition system according to claim 2, further comprising a display which is driven by a display circuit to which the output of said logic circuit is provided.

7. Busline length recognition system comprising a control unit, a plurality of components connected in series by means of a busline, and a terminal processing portion for short-circuiting at least two signal lines in the busline comprising a plurality of signal lines at a terminal component of said plurality of components connected to the busline;

wherein said control unit comprises:

a reset circuit for providing a reset signal to one of said at least two short-circuited signal lines of said terminal processing portion;

a delay circuit for delaying the reset signal of said reset circuit for a delay time set according to a prescribed length of the busline;

a receiver circuit for receiving a reset response signal from the other of said at least two short-circuited signal lines of said terminal processing portion, said reset response signal being output from a first component of said plurality of components, said first component being connected to said control unit;

a logic circuit reset by said reset signal, for taking a logical sum of each output of said delay circuit and said receiver circuit, and for outputting a result signal according to the output of the delay circuit and an output of said receiver circuit; and a display circuit for driving the display according to the output of said logic circuit to indicate whether a prescribed busline length has been exceeded.

* * * * *